(12) United States Patent
Jellison, Jr. et al.

(10) Patent No.: US 11,477,503 B2
(45) Date of Patent: *Oct. 18, 2022

(54) PROVIDING ENRICHMENT CONTENT

(71) Applicant: iHeartMedia Management Services, Inc., San Antonio, TX (US)

(72) Inventors: David C. Jellison, Jr., Ogallala, NE (US); Jeffrey Lee Littlejohn, Cincinnati, OH (US); Richard A. Ramirez, San Antonio, TX (US); Joseph Kubon, III, San Antonio, TX (US); Robert Glenn Speicher, Jr., San Antonio, TX (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/366,230

(22) Filed: Jul. 2, 2021

(65) Prior Publication Data
US 2021/0344984 A1    Nov. 4, 2021

Related U.S. Application Data

(63) Continuation of application No. 16/106,301, filed on Aug. 21, 2018, now Pat. No. 11,057,658, which is a
(Continued)

(51) Int. Cl.
*G06F 16/40* (2019.01)
*G06F 16/41* (2019.01)
*G06F 16/48* (2019.01)
*H04L 65/75* (2022.01)
*H04L 67/10* (2022.01)
*H04L 67/55* (2022.01)
(Continued)

(52) U.S. Cl.
CPC ............. *H04N 21/25* (2013.01); *G06F 16/40* (2019.01); *G06F 16/41* (2019.01); *G06F 16/48* (2019.01); *H04L 65/762* (2022.05); *H04L 67/10* (2013.01); *H04L 67/55* (2022.05); *H04L 67/60* (2022.05); *H04N 21/84* (2013.01)

(58) Field of Classification Search
CPC ........ H04N 21/25; H04N 21/84; G06F 16/40; G06F 16/41; G06F 16/48; H04L 65/762; H04L 67/10; H04L 67/55; H04L 67/60
See application file for complete search history.

(56) References Cited

U.S. PATENT DOCUMENTS 5,893,110 A    4/1999  Weber et al.
6,144,402 A   11/2000  Norsworthy
(Continued)

*Primary Examiner* — Jorge A Casanova
(74) *Attorney, Agent, or Firm* — Garlick & Markison; Edward J. Marshall

(57) ABSTRACT

A method includes assigning different unique identifiers to each of a plurality of different instances of a content item, wherein the different unique identifiers have values included in different ranges of unique identifier values. First information linking particular subscriber identifiers used by particular subscribers to refer to particular instances of the content items is stored. Second information associating an enrichment identifier with a collection of enrichment content is stored. Third information associating the enrichment identifier with a particular range of unique identifier values is stored. Enhanced content is delivered to subscribers based on the first information, the second information, and the third information.

20 Claims, 10 Drawing Sheets

Related U.S. Application Data continuation of application No. 15/199,196, filed on Jun. 30, 2016, now Pat. No. 10,063,898, which is a continuation of application No. 14/795,236, filed on Jul. 9, 2015, now Pat. No. 9,444,869, which is a continuation of application No. 14/016,401, filed on Sep. 3, 2013, now Pat. No. 9,106,654, which is a continuation of application No. 13/356,483, filed on Jan. 23, 2012, now Pat. No. 8,527,527, which is a continuation-in-part of application No. 12/475,363, filed on May 29, 2009, now Pat. No. 8,103,681.

(51) Int. Cl.
*H04L 67/60* (2022.01)
*H04N 21/25* (2011.01)
*H04N 21/84* (2011.01)

(56) References Cited

U.S. PATENT DOCUMENTS

| | | |
|---|---|---|
| 6,918,096 B2 | 7/2005 | Hugh |
| 7,287,029 B1 | 10/2007 | Craft |
| 7,343,414 B2 | 3/2008 | Lipscomb |
| 7,653,574 B2 | 1/2010 | Harper et al. |
| 7,725,454 B2 | 5/2010 | Kamani et al. |
| 8,191,097 B1 | 5/2012 | Armstrong |
| 8,527,527 B2 | 9/2013 | Jellison, Jr. |
| 9,990,647 B2 | 6/2018 | McQuaide, Jr. |
| 2003/0033296 A1 | 2/2003 | Rothmuller et al. |
| 2003/0126048 A1 | 7/2003 | Hollar et al. |
| 2004/0143349 A1 | 7/2004 | Roberts |
| 2004/0148503 A1 | 7/2004 | Sidman |
| 2005/0071283 A1 | 3/2005 | Randle et al. |
| 2005/0209947 A1 | 9/2005 | Shafer |
| 2006/0008256 A1 | 1/2006 | Khedour |
| 2006/0075105 A1 | 4/2006 | Georgy |
| 2006/0116926 A1 | 6/2006 | Chen |
| 2006/0161635 A1 | 7/2006 | Lamkin |
| 2006/0206582 A1 | 9/2006 | Finn |
| 2006/0242554 A1 | 10/2006 | Gerace |
| 2007/0016922 A1 | 1/2007 | Koch |
| 2007/0118572 A1 | 5/2007 | Fischer et al. |
| 2007/0180485 A1 | 8/2007 | Dua |
| 2007/0185879 A1 | 8/2007 | Roublev et al. |
| 2008/0004977 A1 | 1/2008 | Fisher |
| 2008/0140852 A1 | 6/2008 | Halliday |
| 2008/0183757 A1 | 7/2008 | Dorogusker et al. |
| 2009/0024589 A1 | 1/2009 | Sood |
| 2009/0064233 A1 | 3/2009 | Kondo |
| 2009/0100480 A1 | 4/2009 | McQuaide, Jr. |
| 2009/0300162 A1 | 12/2009 | Demarie |
| 2010/0205223 A1 | 8/2010 | Millington |
| 2010/0234431 A1 | 9/2010 | Jiaang |

PROVIDING ENRICHMENT CONTENT

CROSS REFERENCES TO RELATED APPLICATIONS

The present U.S. Utility patent application is a continuation of U.S. Utility application Ser. No. 16/106,301, entitled "PROVIDING DIFFERENT ADDITIONAL CONTENT TO DIFFERENT SUBSCRIBERS," filed Aug. 21, 2018, scheduled to issue as U.S. Pat. No. 11,057,658 on Jul. 6, 2021, which is a continuation of U.S. Utility application Ser. No. 15/199,196, entitled "STATION OVERRIDE OF REQUESTS FOR ENRICHING CONTENT," filed Jun. 30, 2016, now U.S. Pat. No. 10,063,898, which is a continuation of U.S. Utility application Ser. No. 14/795,236, entitled "ASSOCIATING UNIQUE IDENTIFIERS OF PRIMARY ENRICHING CONTENT," filed Jul. 9, 2015, now U.S. Pat. No. 9,444,869, which is a continuation of U.S. Utility application Ser. No. 14/016,401, entitled "UNIFYING CONFLICTING MEDIA IDENTIFIERS," filed Sep. 3, 2013, now U.S. Pat. No. 9,106,654, which is a continuation of U.S. Utility application Ser. No. 13/356,483, entitled "CONTENT ENRICHMENT USING UNIFIED SYSTEM OF UNIQUE IDENTIFIERS," filed Jan. 23, 2012, now U.S. Pat. No. 8,527,527, which is a continuation-in-part (CIP) of U.S. Utility application Ser. No. 12/475,363, entitled "ASSOCIATING WORKS WITH UNIQUE IDENTIFIERS," filed May 29, 2009, now U.S. Pat. No. 8,103,681, all of which are hereby incorporated herein by reference herein in their entirety and made part of the present U.S. Utility patent application for all purposes.

FIELD

The present disclosure relates generally to utilizing unique identifiers, and more particularly to associating works with unique identifiers.

BACKGROUND

Content providers send songs and other content to broadcasters and others in any of a number of formats. While numbering systems used by particular content providers may be internally consistent, broadcasters receiving content from providers using different numbering schemes are left with the sometimes difficult task of coordinating the different numbering systems to allow efficient management of their own businesses. Known arrangements and processes are less than perfect for dealing with the many issues arising from inconsistent and possibly incompatible numbering schemes.

SUMMARY

Various embodiments include a method for use in a system that receives primary content from a plurality of sources, and delivers content to a plurality of subscribers for further distribution to end users. Various methods include receiving a message, which may be a push-now-playing (PNP) message including a primary content alias and a station identifier, the primary content identifier associated with a primary content element being delivered by a subscriber, and the station identifier indicating a station on which the primary content is being delivered. The method also matches an alias assigned or otherwise associated with the primary content, with a master unified numbering system (UNS) identifier. Enrichment data can be selected based on the master UNS identifier and provided to the subscriber.

Additionally, a determination can be made about which enrichment data to provide to a subscriber based on subscriber preferences associated with the primary content being delivered. In some implementations, different enrichment data can be provided to different subscribers, even if each of the subscribers is delivering the same primary content element. Subscriber preferences can be associated with a master UNS identifier. In some cases enrichment data is provided based on an override status associated with the station, and based on whether the station requesting enhanced data is a master station. Furthermore, enrichment data associated with scheduled content items identified in a PNP message can be temporarily stored in an enrichment cache. UNS identifiers can also be used to track public performances of the primary content by multiple different subscribers, and to assist in implementing billing procedures.

At least one embodiment includes a server for use in a system that receives primary content from a plurality of sources, and delivers content to a plurality of subscribers for further distribution to end users. The server includes circuitry to implement an initial match module and a re-match module. The initial match module is configured to match each of a plurality of primary content items received from a plurality of sources implementing different identification schemes to a master unified numbering system (UNS) identifier, and to match each of a plurality of aliases employed by a plurality of different subscribers to a master UNS identifier. The re-matching module is configured to un-match an alias from an associated master UNS identifier in cases where the alias and the master UNS identifier are mismatched, and re-match an unmatched alias to a master UNS identifier. The server can also include circuitry configured to implement various methods described herein.

Various embodiments also include a server that includes circuitry configured to implement a push-now-playing PNP service that receives a PNP message including an alias identifying a primary content element currently being broadcast, and a station identifier associated with a subscriber station currently broadcasting the primary content. The server also includes circuitry configured to match the alias to a UNS identifier, circuitry configured to use the master UNS identifier to deliver enriched content to the subscriber; and circuitry configured to determine and store billing information associated with delivery of the enriched content.

Various embodiments can be implemented as system, including memory, a communications interface coupled to the memory and configured to receive information associated with a work, and a processor operably coupled to the communications interface and to the memory. The processor can be configured to execute a program of instructions to perform the various techniques and tasks disclosed herein. Yet other embodiments can take the form of a computer readable medium tangibly embodying a program of computer executable instructions. In some implementations, circuitry other than a programmed processor can be used to implement the varied embodiments described herein.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

Figure 1:
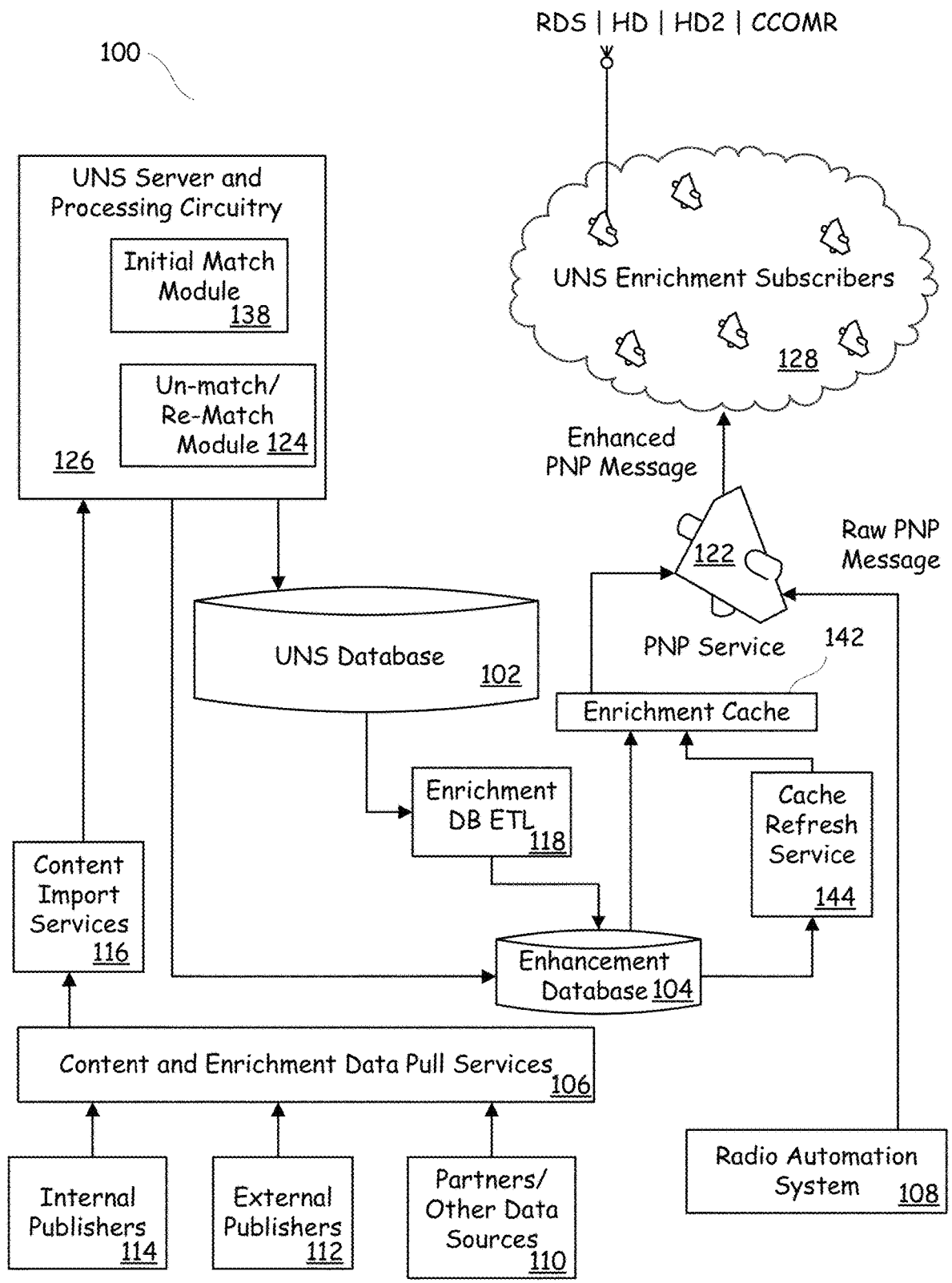
FIG. 1 is a block diagram illustrating the overall architecture of a unified matching system capable of delivering enriched or enhanced content to subscribers, according to embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Various embodiments described in this disclosure permit content from a number of different content providers—each of which may utilize a different, proprietary numbering or identification scheme—to be accessed, processed, tracked, or otherwise handled based on an overarching, or unified numbering system (UNS). Such a numbering system, according to some embodiments of the present disclosure, can allow tracking of content from multiple different content libraries for various purposes. Various embodiments of the present disclosure can utilize a UNS to facilitate, for example, verifying that a particular work has been publicly performed, establishing royalty payments to organizations assigned to collect those payments, such as the American Society of Composers, Authors and Publishers (ASCAP) or Broadcast Music Incorporated (BMI), to set advertising rates, or the like.

In some implementations, the UNS system is also used to match enhancing or enrichment content with primary content, to allow subscribers to receive appropriate enhancing or enriching content for further broadcast or delivery to end users. For example, if the primary content is a song from a particular musical group's compact disc, that particular song can be assigned a particular UNS number. Enriching or enhancing content, for example, album cover art, song title, video, interviews, articles, length of song, date the song was written, whether the song is a remake, band member names, or similar information, can be associated with the UNS number of the primary content. When the primary content is broadcast or otherwise delivered by a subscriber, the subscriber can send a message to a UNS server or other system device that includes an identifier associated with the primary content. Using the identifier received in the PNP or other message, the UNS system determines a UNS identifier associated with the primary content, matches the enriching content to the UNS identifier, and delivers the enriching content to the subscriber.

Various embodiments can employ matching techniques to conform identifiers that might be used by multiple different music libraries, advertisers, or other content providers into a common, unified numbering system. For example, some embodiments include systems and methods that allow a song or other work having multiple different aliases to be linked or associated with a single unique identifier to facilitate tracking, or other suitable uses of information associated with a work.

Some embodiments can take advantage of a UNS as part of interactive content delivery. For example, a subscriber can provide a processing system with information about preferences, such as the type of information a user desires to receive in conjunction with the broadcast of a song or other work. One subscriber may request to receive information limited to song titles, while another can request information about an artist performing the song, the year the song was released, the song's chart ranking, or the like.

Various embodiments can deliver different information to different subscribers during a time when each of the different subscribers is receiving the same broadcast work, where the term "work" is used in the present disclosure interchangeably with the term "primary content." Furthermore, some embodiments permit a subscriber to record preferences on a portable device while receiving a broadcast of the work. The subscriber can subsequently connect the portable device to a network, such as the Internet, to provide the preferences to a server, which will respond to the subscriber's preferences by providing content associated with the work being broadcast at the time the subscriber recorded his preference.

An initial assignment, or match, of a UNS identifier to a partner identifier, or an initial match of a subscriber alias to a UNS identifier, may need to be un-matched or re-matched if, for example, the partner or subscriber make changes to primary content or identifiers. For example, if a subscriber, using primary content associated with a UNS identifier, changes the primary content so that it no longer matches the primary content associated with the UNS identifier, the PNP message sent by the subscriber to the UNS system could cause the UNS system to send incorrect enriching information to the subscriber. Thus, if content associated with an alias matched primary content associated with a UNS identifier at one time, but no longer does, the alias and the UNS identifier, also referred to as a "master" identifier, can be unmatched and re-matched as required or desired. Likewise, if a partner or content provider changes either the primary content, or an identifier associated with primary content, the primary content can be re-matched with a new master UNS identifier, or unmatched and re-matched with an appropriate existing master UNS identifier.

Referring first to FIG. 1, a UNS system 100 is illustrated and discussed according to various embodiments of the present disclosure. UNS system 100 may include UNS server and processing circuitry 126, which may include initial match module 138 and unmatch/re-match module 124, UNS database 102, content import services 116, content and enrichment data pull services 106, internal publishers 114, external publishers 112, partners/other data sources 110, enhancement database 104, enrichment cache 142, cache refresh service 144, UNS enrichment subscribers 128.

In various embodiments, UNS database 102 stores information associating unique master UNS identifiers with provider identifiers of primary content, which can be provided by content publishers and other data sources such as internal publishers 114, external publishers 112, and partners/other data sources 110. UNS database 102 can also store information linking various primary content aliases to a master UNS identifier. Note that although the term UNS stands for unified numbering system, UNS identifiers are not necessarily limited to numbers, but can include alphanumeric characters, or other suitable identifier types, so long a substantially unique UNS identifier can be used for each piece of primary content. Uniqueness can be determined at any suitable point in time, and thus UNS identifiers can, in some instances, be re-used if no longer assigned to other primary content. This situation can arise, for instance, when a primary content advertisement is no longer used and does not need to be tracked in the future. In this and similar cases, UNS numbers can be reused if desired.

UNS database 102 can receive instructions and content from UNS server and processing circuitry 126 directly, or under control of UNS server and processing circuitry, although all such data connections are not illustrated to simplify discussion. UNS server and processing circuitry can also send data to enhancement database 104 directly or via UNS database 102 and enrichment DB extract, transfer, load (ETL) circuitry 118, which stores enrichment and enhancement data to be provided to UNS enrichment subscribers 128 for delivery to end users via various systems such as Radio Data System (RDS), high definition radio (e.g., HD or HD2), via television, cable, satellite, or the Internet, for example via Clear Channel online music radio (CCOMR).

UNS server and processing circuitry can include a processor, server, specialized circuitry, or combination thereof, and can be used to implement an initial match module 138, which performs or assists in generating master UNS identifiers and establishing associations between master UNS identifiers, primary content, partner and publisher identifiers, and alias identifiers used by subscribers such as UNS enrichment subscribers 128. Unmatch/re-match module 124, can be used to determine whether or not content should be unmatched from a current UNS identifier, or re-matched. The same or separate circuitry can be used to perform re-matching as that used to perform initial matching. The content to be assigned master UNS identifiers can be received from content import services 116, which in turn obtains the content from content and enrichment data pull services 106 in some embodiments.

Initial match module 138 can also be used in embodiments in which some instances of primary content are duplicated for use in different markets, or for use with variable service or subscription levels. For example, in some cases where particular primary content is designated for selective delivery only, e.g. to premium subscribers, multiple instances of the primary content can be created—each with its own UNS identifier. In some such cases, the UNS identifiers associated with each of the multiple instances of the primary content can be linked to a particular master UNS identifier, which can facilitate providing enhanced content to subscribers. In some cases, one of the UNS identifiers associated with one of the instances can be designated as the master UNS identifier, while in others a third UNS identifier is designated as the master UNS identifier. Using multiple UNS identifiers for multiple instances of content can facilitate managing content or providing enrichment based on the UNS identifier of particular content. For example, providing some enrichment for content having a UNS identifier in one range, while UNS numbers in another range can be provided a different level of enrichment content.

Note that in some embodiments, a master UNS identifier can also be assigned to a collection of enhancement or enrichment content, and the master UNS identifier associated with primary content can be associated with an enrichment UNS identifier associated with the enrichment content. In at least one embodiment, enrichment content is stored in enhancement database 104 with a relational entry linking the enrichment content to a master UNS identifier that is associated with primary content. In this way, by identifying a master UNS identifier associated with particular content, enrichment content can be indirectly linked to the primary content.

In at least one embodiment, a radio automation system implemented by a UNS enrichment subscriber 128 can be programmed or otherwise configured to play or broadcast a playlist of songs and advertisements via various communication channels. In at least one embodiment, a push-now-playing (PNP) message is generated by radio automation system 108, and delivered to PNP service 122. As described herein, a PNP message can include metadata describing a station, band frequency, and primary content element, artist, title, length currently playing at a specific radio station, as well as the metadata for a number of elements scheduled to play after the current element. PNP messages are generally sent from an individual station during a time when elements are playing, and are sent to the UNS system for play count tracking, matching, enrichment, and delivery to final endpoints, such as HD Radio, car displays, etc.

PNP service 122 uses the contents of the PNP message, which can include an alias identifier of the content being broadcast, to identify the appropriate master UNS identifier, which is in turn used to identify enrichment content associated with the master UNS identifier. In various embodiments, PNP service 122 can pull the appropriate enrichment or enhancement data from enrichment cache 142. Enrichment cache 142 can in some embodiments, be used to temporarily store content that is expected to be played in the near future. For example, some PNP messages include information for the next 9 songs to be played. Thus, enrichment information for those next 9 songs can be copied from enhancement database 104 into enrichment cached 142 in preparation for the next PNP message from the same station, which more likely than not will indicate that the next scheduled song, as indicated in the previous PNP message, is currently being broadcast. In some embodiments, a cache refresh service 144 is used to update enrichment cache 142 periodically, upon request from radio automation system 108, or upon request from UNS server and processing circuitry. Use of enrichment cache 142 and cache refresh service 144 is optional in some implementations. Also, although not specifically illustrated, PNP service 122 can be implemented as a dedicated server machine, as part of UNS server and processing circuitry 126, or as part of radio automation system 108.

Figure 2:
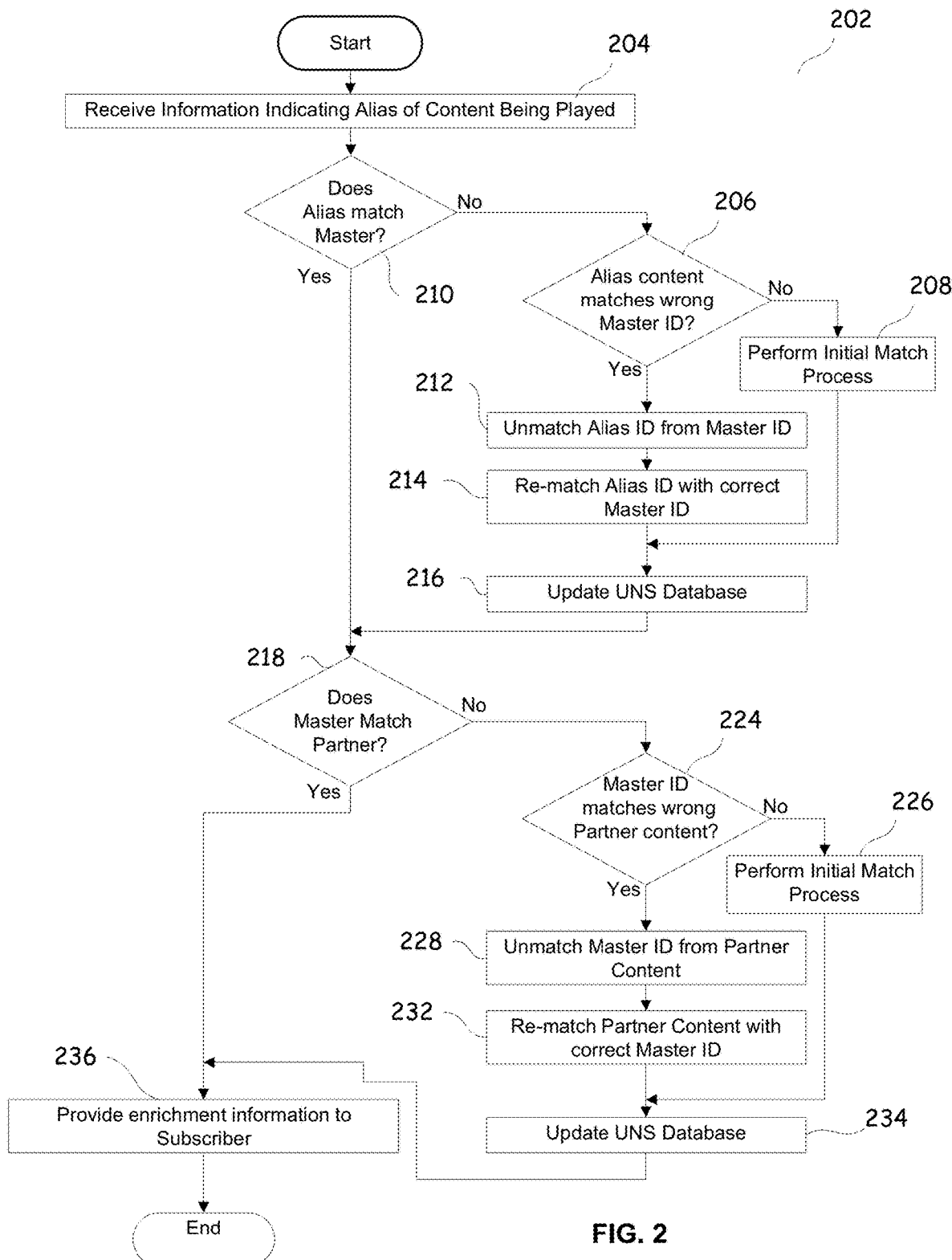
FIG. 2 is a flow diagram illustrating un-matching and re-matching content in an exemplary context of providing enriched or enhanced content, according to various embodiments of the present disclosure.

Referring next to FIG. 2, a method 202 according to various embodiments of the present disclosure is illustrated. Method 202 may begin at block 204 by receiving, usually from a subscriber, information indicating an alias of a song or other content currently being broadcast or played by a particular subscriber. The information can be received in the form of a PNP message, a request, a response to an inquiry sent by a UNS server, PNP service, or otherwise.

The information contained in the PNP message can include an alias identifier associated with the song or other content being played by the subscriber. As illustrated by block 210, a check can be made to determine whether content associated with the alias identifier included in the PNP message matches primary content associated with a master identifier. For example, if the alias included in the PNP message indicates that Song A is being broadcast, the alias can be examined to determine if the alias is associated with a master UNS identifier in the UNS database. If SONG A is not associated with a master UNS identifier stored in the UNS database, block 210 may return a NO result. In some embodiments, a NO result is also returned at block 210 if content associated with the alias in the PNP message does not match the content associated with a corresponding master UNS identifier. For example, if the alias indicates SONG A, but is actually the content associated with a master UNS identifier associated with SONG B, the result of block 210 will be NO.

As illustrated by block 206, if the result of block 210 is NO, and the alias included in the PNP does not match any current master UNS identifier, an initial match can be performed at block 208. However, if the alias identified in the PNP message is a mismatch, and it matches with an incorrect master UNS identifier, the alias can be un-matched at block 212. Once unmatched, the alias can then be re-matched at block 214 with a correct master UNS identifier. Matching and re-matching can be performed in a manner similar to matching content when initially received from a content source, partner, or other provider. Once an alias is properly matched to a master UNS identifier, information relating the alias to the master UNS identifier can be stored in the UNS database, as illustrated at block 216.

As illustrated by block 218, in response to the alias being properly matched to a master UNS identifier, a check can be made to determine whether the master UNS identifier matches a partner identifier or content. Note that partner identifiers refer to identifiers assigned by content providers, publishers, partners, or the like. In a manner similar to block 210, block 218 can check for both unmatched and mismatched master UNS identifier/Partner pairs. Thus, if the master UNS identifier does not match any stored partner identifier, or if the content associated with the master UNS identifier matches content associated with a different partner identifier than expected, block 218 can return a NO result.

At block 224, a determination can be made regarding whether there is no match between master and partner, or a mismatch. In the event of no match, an initial match process can be performed at block 226. In the event of a mismatch, the master UNS identifier and the partner identifier can be unmatched at block 228 and re-matched at block 232. Once the master UNS identifier and the partner identifier are properly matched, the UNS database is updated at block 234 accordingly.

As shown by block 236, if a PNP message specifies an alias that matches a master UNS identifier, and the master UNS identifier matches a partner identifier, enrichment information can be provided to the requesting subscriber. In some embodiments, the PNP message itself, or a portion thereof, can be enriched and forwarded to a requesting subscriber. In other embodiments, the enrichment data can be sent via a separate message on the same communications channel, or via a completely different communications channel. Thus, a PNP message can result in enrichment data being provided to the originator of the PNP message in a response via a control channel, or via a dedicated communication link. Furthermore, although the enrichment data is provided by the UNS system in some embodiments, in other embodiments some or all of the enrichment data can be provided to subscribers via a third party in response to control or authorization signals provided by the UNS system.

Figure 3:
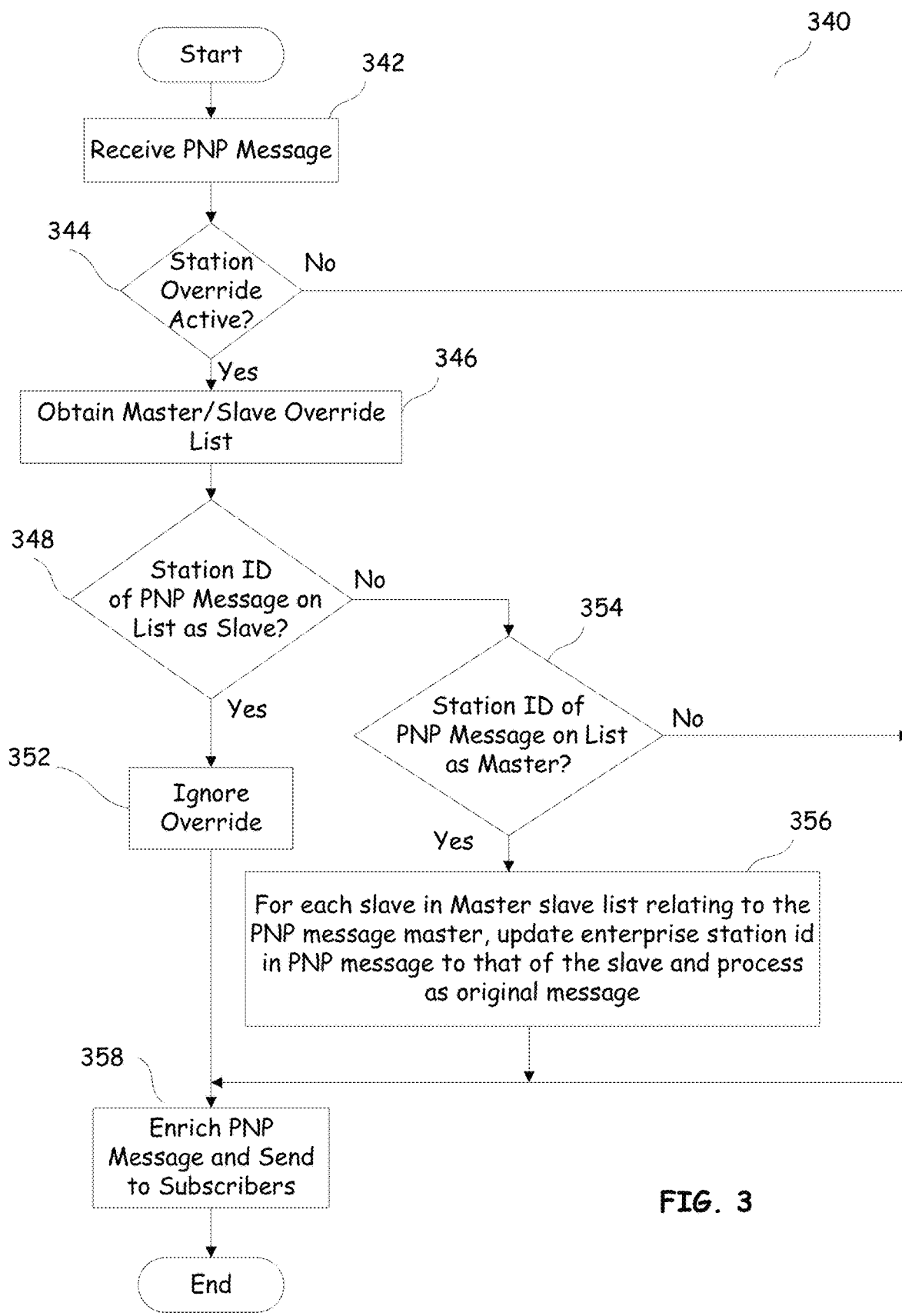
FIG. 3 is a flow diagram illustrating overriding enriched or enhanced content indicators received in a push-now-playing (PNP) message, according to various embodiments of the present disclosure.

Referring next to FIG. 3, a method 340 for servicing requests for enrichment data is illustrated and discussed. As illustrated at block 342, a PNP message can be received from a subscriber's station, and can include a request for enhancement or enriching data to be supplied. In some embodiments, the PNP message includes a specific request for enhancement, while in others the receipt of a PNP message acts as an implicit request for enhancement or enrichment. The PNP request can come from a "master" station, which refers to a subscriber station that provides content for retransmission by "slave" stations. The term "slave" station refers to stations that retransmit content provided by master stations. In some cases, slave stations may retransmit a large portion of the same content transmitted by master stations, yet still be provided some time slots to fill independently with advertisements or other content, for example content specific to a local geographic region. In other examples, a master station can correspond to a primary broadcast station, and a slave station can correspond to an Internet station that rebroadcasts most of the content broadcast by the primary broadcaster, with some allowance for minor differences. In some cases, for example, a master station may request enhancement for itself and particular slave stations, while prohibiting slave stations to receive enriched data. This allows, for example, users of a first slave station to receive one level of enhancement, and users of another slave station to be blocked from receiving enhancing data, despite the fact that both slave stations are rebroadcasting essentially the same primary content that was initially broadcast by a master station.

At block 344, a check can be made to determine if a station override is active. A station override can refer to a preference, flag, hardware or software setting, or the like that indicates whether a PNP message from any station should always result in delivery of enrichment information, if enrichment information is available. In other embodiments, the station override can be set on a per-master basis. In some such embodiments, if a master station has a corresponding station override flag set (or cleared depending on whether negative or positive logic is used), further checks are performed before providing enrichment data to any slave stations under control of the master station. If the station override setting indicates that no slave stations under control of a master station identified in the PNP message are prohibited from receiving enrichment data, enhancement data can be provided in response to the PNP message.

If the station override is active, a master/slave override list can be obtained at block 346. The master/slave override list can be, in some instances, a list identifying which slave stations under control of a particular master station are allowed to receive enhancement data. In some instances, the list can also indicate which level of enhancement data a particular slave station is authorized to receive. In some cases, an amount of enrichment data, for example a number of enhancements requested, can also be included in the master/slave override list. In some embodiments, multiple lists are used. In some such instances, a different list is used for slave stations associated with different master stations. In other embodiments a single list includes information for all subscribing master stations and their corresponding slave stations. The master/slave override list can also be used to distinguish between master stations that subscribe to receive enrichment data, and those that do not.

As illustrated by block 348, if the station ID associated with the PNP message is on the list as a slave, further processing can be performed. If block 348 indicates that the station ID associated with the PNP message is not on the list as a slave, method 340 may ignore the override as illustrated by block 352, and may provide the enriched content as illustrated by block 358.

As illustrated by block 354, if the station ID in the PNP message is not on the list of slave stations, a check can be made to determine if the station ID is a master station. If the station ID is neither a slave station nor a master station, an enriched PNP message can be delivered to the subscriber station.

If, at block 354 a determination is made that the station ID associated with the PNP message is on the master/slave list, but is on the list as a master, method 340 proceeds to block 356. As illustrated by block 356, the UNS can process a PNP message that includes a station ID associated with a master station by updating the enterprise station ID originally included in the PNP message to refer to a slave station associated with the master station, and processing the updated PNP message as if it were the original PNP message. This process can be repeated for each slave station associated with the master station. Updating the enterprise station ID in the PNP message can be used to facilitate proper billing and accounting of content known to have been played on each slave station, and to facilitate proper delivery of enriched data and metadata to slave stations.

An example of the procedure described at block 356 is a live override procedure in which PNP or other messages originating from a master station are copied out to each of multiple different slave stations (sometimes referred to as subscriber stations) while PNP or other messages from the slave stations can be suppressed or ignored.

Figure 4:
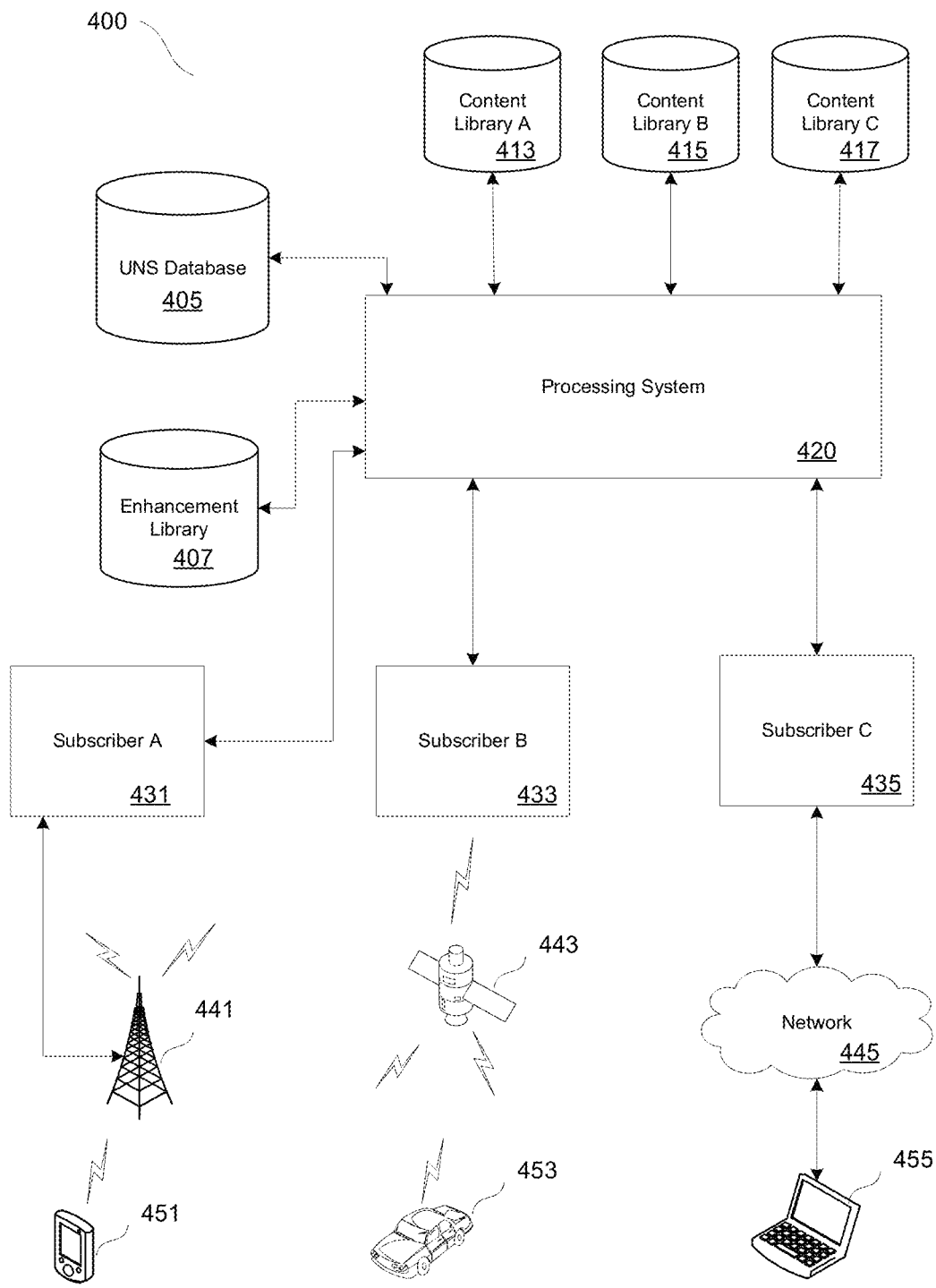
FIG. 4 is a block diagram of a broadcasting system employing a unified numbering system (UNS) to deliver content to subscribers according to an embodiment of the present disclosure.

Referring next to FIG. 4, a block diagram of a broadcasting system employing a UNS is illustrated according to an embodiment of the present disclosure. System 400 can include a processing system in communication with one or more content libraries. For example, FIG. 4 shows a system 400 having a processing system 420, which is in communication with content library A 413, content library B 415, and content library C 417. Processing system 420 may also be in communication with a UNS database 405 and an enhancement library 407. Content library A 413 can provide processing system 420 with information associated with various works, including songs, advertisements, or the like, indexed using a proprietary, or nonproprietary numbering or other identification system. The indexing format in which content library A 413 provides information to processing system 420 may be different from the indexing format of information provided by content library B 415, and different still from that used by content library C 417. Processing system 420 can receive information from all three content libraries 413, 415 and 417, and assign each work from the various content libraries a unique number. The unique number associated with each element of content provides a single unified numbering system for all the content, regardless of its source.

Processing system 420 can also be in communication with UNS database 405 and enhancement library 407. UNS database 405 can store unique identifiers and other information linking content from content libraries A 413, B 415, and C 417 in a uniform manner. So for example, when processing system 420 receives content, a numeric, alphanumeric, or other identifier selected from a single set of identifiers can be associated with the received content, and the identifier stored in UNS database 405.

In some embodiments, UNS database 405 stores not only identifiers associated with received content, but also the content itself, and other related information. For example, when processing system 420 retrieves content from one of the content libraries A 413, B 415, or C 417, processing system 420 can also retrieve enhanced content from enhancement library 407. An association can be established between the information received from enhancement library 407 and content retrieved from content libraries A 413, B 415, or C 417. In some embodiments, the enhanced content may be added, updated, or otherwise integrated with content received from content libraries A 413, B 415, or C 417, and stored along with that content in UNS database 405.

Enhanced content from enhancement library 407 may include information such as song titles, song length, song release dates, artists, authors, owners, aliases, chart rankings, or other desired information. In some embodiments, one or more content libraries may store one or more categories of information which is different from the categories stored on one or more other content libraries. It should be noted that content from content libraries A 413, B 415, and C 417 is not necessarily limited to songs and information related to songs. For example, content library A 413 may include video and related information, content library B 415 may store audio and related information, and content library C 417 may provide commercial information such as advertisements or the like.

The various types of content contained in content libraries A 413, B 415, and C may be referred to as "works" in the present disclosure. Furthermore, as used herein, the term "works" is intended to include at a minimum content that falls within the meaning of works as used in copyright law, but is not intended to be limited to only copyright eligible content. Instead, the term works is meant to be interpreted in its broadest sense as including any of various perceivable content that may be delivered by processing system 420, or another suitable processing system, to subscribers, endusers, or other systems.

As used herein, the term "subscriber" is intended to encompass not only individuals, companies, or other entities who pay a fee or register to receive particular services, although such entities are envisioned within the term subscriber. Instead, the term subscriber may also include individual end-users, viewers and listeners, or other entities to which processing system 420 may deliver a work, regardless of whether the delivered work includes enhanced content or otherwise. In some embodiments, for example, "subscriber" may refer to an intermediary, such as a broadcaster. But "subscriber" may also refer to an end user who receives the content from the broadcaster.

Processing system 420 can be used to provide works and related content to subscriber A 431, subscriber B 433, and subscriber C 435. Subscriber A 431 can receive information from processing system 420 and provide that information via broadcast equipment 441 to a portable receiver 451. Note that broadcast equipment 441 can include any of various terrestrial broadcasting stations, units, and other equipment. Portable receiver 451 is depicted as a personal digital assistant (PDA), but is not so limited. Portable receiver 451 may also include any suitable portable or fixed location device, such as a cellular or other wireless telephone, a laptop or other mobile computing device, a desktop, a portable radio, a digital or analog music player, or the like, that allows a user in possession of the device to receive broadcast signals or other terrestrial wireless signals from broadcast equipment 441.

Likewise, processing system 420 can be used to provide works and related content to subscriber B 433, which in turn transmits information received from processing system 420 via satellite 443 to satellite receiver 453. Although satellite receiver 453 is depicted as a vehicle, it is not so limited, and may include any suitable device capable of receiving satellite broadcast signals. Such devices may include radios, digital or analog music players, mapping devices, or other similar devices capable of receiving a satellite signal.

Processing system 420 can also be used to provide works and related content to subscriber C 435, which can transmit received content to networked receiver 455 via network 445. Although networked receiver 455 is illustrated as a laptop computer, it is not so limited. Networked receiver 455 may include any of various devices capable of communication via a wireless or wired network, and can include various radios, televisions, personal computing devices, workstations, laptops, desktops, PDAs, smart phones, or the like.

Network 445 may include any of various local or wide area networks, including, but not limited to a public switched telephone network (PSTN), a cellular telephone network, a home or business local area network, or the like. Subscriber C 435 may be, for example, an Internet provider, television broadcaster, radio station, music service, or the like that provides works or associated content via network 445. Network 445 can include elements and subsystems in common with broadcast equipment 441 and satellite 443. Furthermore, a single device (not illustrated) may be capable of serving multiple functions, and may include communication interfaces permitting that single device to act as a portable receiver 451, a satellite receiver 453, and a networked receiver 455.

In general operation, processing system 420 can receive information from one or more of content library A 413, content library B 415, and content library C 417. The received information can be enhanced with information from enhancement library 407, and associated with a unique number from UNS database 405. Processing system 420 may store the information received from the content libraries in UNS database 405 or in another suitable storage device, or may simply pass through the content, enhanced or unenhanced, to one or more of subscriber A 431, subscriber B 433, and subscriber C 435. In addition to the content, processing system 420 can provide from UNS database 405 the unique identifier associated with the content.

The content provided to subscriber A 431 need not be the same content provided to subscriber B 433 or subscriber C 435. In some embodiments, for example although the same work is provided to multiple subscribers, each subscriber can be provided different enhanced content. Subscriber A 431, for example, may receive a minimal amount of enhanced content including a title, while subscriber B 433 receives additional enhanced content, such as a title, the work's release date, the work's highest Billboard chart ranking, and the name of the work's author. By providing subscriber A 431, subscriber B 433, and subscriber C 435 with content from one or more of content library A 413, content library B 415, and content library C 417 in conjunction with a unique identifier from UNS database 405 associated with each content, processing system 420 can provide improved tracking and monitoring of content delivered to portable receiver 451, satellite receiver 453, and networked receiver 455.

Figure 5:
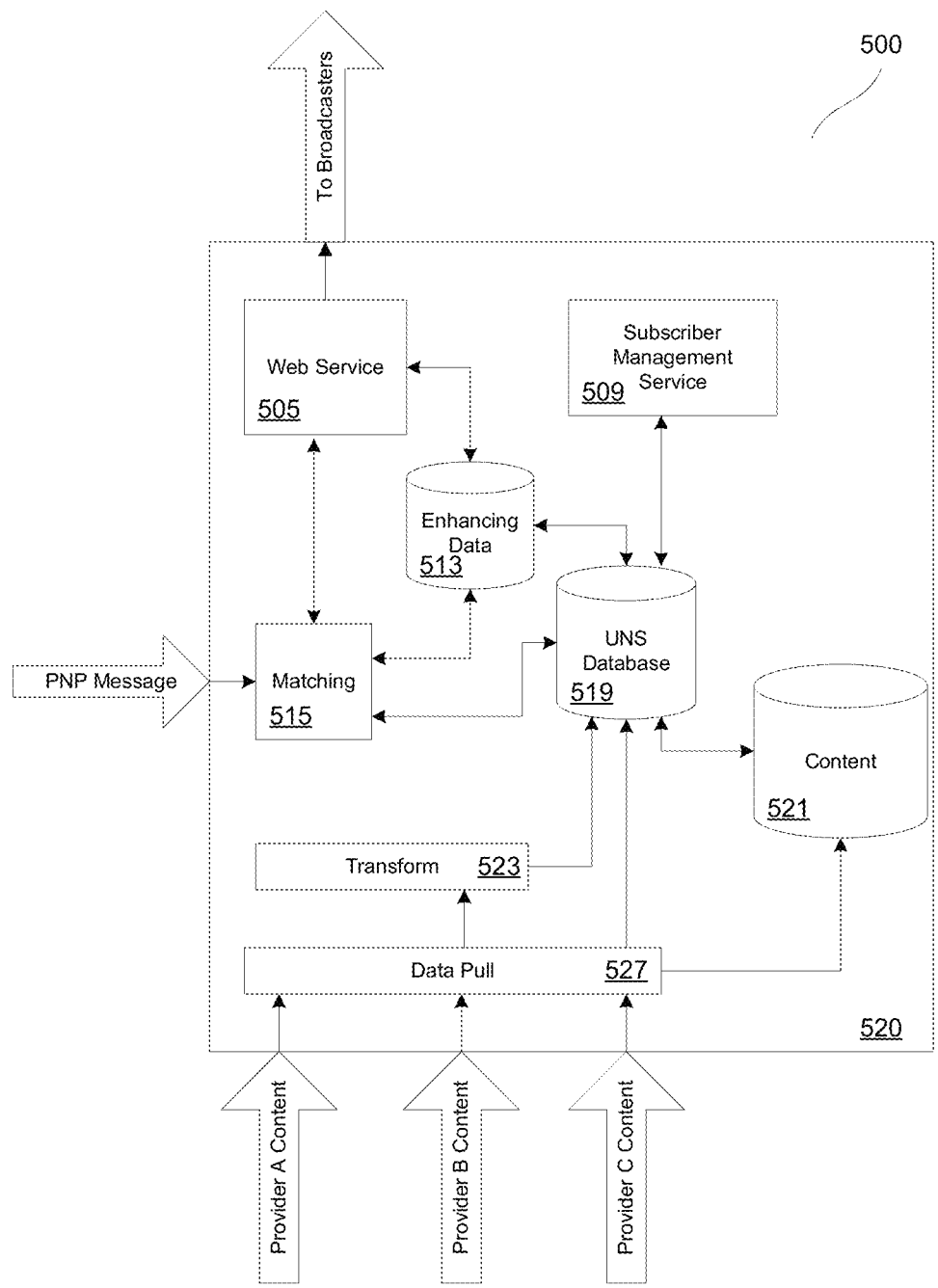
FIG. 5 is a block diagram illustrating the operation of a UNS processing system according to an embodiment of the present disclosure.

Referring next to FIG. 5, various embodiments of a processing system 500 are disclosed. Processing system 500 can receive works or other content from various sources, and can assign the works unique identifiers that are part of a unified numbering system. In some embodiments, a work is provided to a broadcaster along with its unique identifier. The broadcaster or another entity can provide a message to processing system 500 indicating that a work is being broadcast. In response to the message, processing system 500 can match the work identified in the message with one of the works assigned a unique number. The matching can permit more effective management of the works.

Processing system 500 can include server system 520, which can receive works from one or more of provider A, provider B, and provider C, and deliver enhanced information to broadcasters or other subscribers. Additionally, server system 520 can receive a push-now-playing (PNP) message from a broadcaster or other source indicating that a particular work is scheduled to be broadcast in the near future, or that the work is currently being broadcast. A PNP message, for example, can include a list of the next 10 songs, advertisements, spots, or other works a broadcaster is intending to broadcast or otherwise deliver to end users. The first work on the list can indicate a work that is currently being delivered; the second work can indicate the very next work to be delivered, and so on. In some embodiments, a series of one or more PNP messages can be received from each subscriber at predetermined periods of time, with each PNP message being updated with more recent information.

Server system 520 can include data pull subsystem 527, which obtains one or more of provider A content, provider B content, and provider C content. Server system 520 may also include transformation subsystem 523, which can convert some or all of the content obtained by data pull subsystem 527 into a desired format usable by server system 520. In some embodiments, transformation subsystem 523 selectively converts songs, advertisements and other content based on whether or not the content is already in a format suitable for processing by the remainder of server system 520. For example, transformation subsystem 523 can transform provider A content and provider B content, but pass provider C content to other portions of server system 520 without transformation. In some embodiments, data pull subsystem 527 includes circuitry or logic that can deliver content directly to UNS database 519, content database 521, or another portion of server system 520, thereby bypassing transformation subsystem 523. In some embodiments, transformation subsystem 523 can leave the majority of the content received from data pull subsystem 527 unaltered, and be utilized primarily for transforming identifying information, such as proprietary numbering systems, into a suitable format for use by server system 520.

In some embodiments, songs, advertisements, and other works included in provider A content, provider B content, and provider C content can be stored in content database 521, while identifying information associated with the works is separated from the works and stored in one or more of UNS database 519, enhancing database 513, and/or another desired location separate from the location in which the works are stored. In some such embodiments, appropriate database links are stored along with the works and the identifying information, so that the relationships between the separately stored works and identifying information can be maintained. In some embodiments, however, works and identifying information can be stored together.

UNS database 519 can store unique identifiers and other information associated with works included in provider A content, provider B content, and provider C content. UNS database 519 can also exchange information with subscriber management service 509, content database 521, matching subsystem 515, and enhancing database 513. In some embodiments, enhanced data from enhancing database 513 and information from UNS database 519 can be provided to web service 505, which can in turn provide that information to broadcasters or other subscribers.

Subscriber management service 509 can include various tools to allow subscribers, to transmit their preferences to server system 520. Subscriber management service 509 can also provide a subscriber with the ability to add or remove particular works or associated content from information transmitted to the subscriber from server system 520. For example, a subscriber may indicate that he does not want to receive a particular song from server system 520, or that along with each song provided by server system 520 the subscriber wants to receive particular enhancing data— either for the subscriber's own consumption, or to be broadcast to end-users or other entities.

Matching subsystem 515 can match information included in incoming messages to information stored in the UNS database to facilitate tracking works that have been publicly performed. For example, a PNP message can include information associated with a work that is being or will be publicly performed, including a UNS identifier associated with a particular song. If a PNP message includes a UNS identifier, matching subsystem 515 verifies that UNS identifier included in the PNP message matches a UNS identifier stored in the UNS database. If the UNS identifier in the PNP message matches a UNS identifier stored in the UNS database, server system 520 can retrieve the work associated with the UNS identifier from content database 521 and enhancing data associated with the UNS identifier from enhancing database 513. The work and the enhancing data can be provided to web service 505, which in turn delivers to subscribers the work associated with the UNS identifier contained in the PNP message.

In some instances, the PNP message may not contain a UNS identifier. Where a PNP message does not contain a UNS identifier, a work can be matched to a UNS identifier associated with a known work based on other information. For example, a PNP message can contain information such as a song's title, or the artist's name. A PNP message can also include a station identifier and an indication of when the work was broadcast. Matching subsystem 515 can attempt to identify which of the unique numbers in UNS database 519 is associated with a work having the same song title, artist, or other information included in the PNP message If a match is found, web service 505 can be provided with the work associated with the UNS identified, along with enhanced data from enhancing database 513. The desired type and scope of enhanced data provided to a broadcaster or other subscriber can be regulated based on indicated subscriber preferences, which can be stored in subscriber management service 509.

In some instances, a PNP message may not include information that can be matched to a UNS identifier stored in UNS database 519. In that event, matching subsystem 515 can generate a no-match indicator, and provide that indicator to another system (not illustrated) for further review. Further review and matching may be performed by one or more machines, or by humans if necessary.

Web service 505 can provide to subscribers content that includes a UNS identifier from UNS database 519. The UNS identifier can be provided in conjunction with an advertisement, a song, or other work. When a subscriber broadcasts or plays the work, it can provide server system 520 with a PNP message that indicates works that may be played, have been played, or are scheduled to be played. Server system 520, can use matching subsystem 515, along with the information included in the PNP message to ensure that the proper entity receives appropriate compensation for the use of their work. For example, rather than paying a fee based solely on the general popularity of a song, or the average number of times a work is aired, some embodiments facilitate payment of royalties based on the number of times a work is actually publicly performed. Likewise, rather than setting advertising rates based primarily on demographic data, server system 520 can determine each instance a particular spot is played, broadcast, or aired, and set advertising rates based on that determination.

Figure 6:
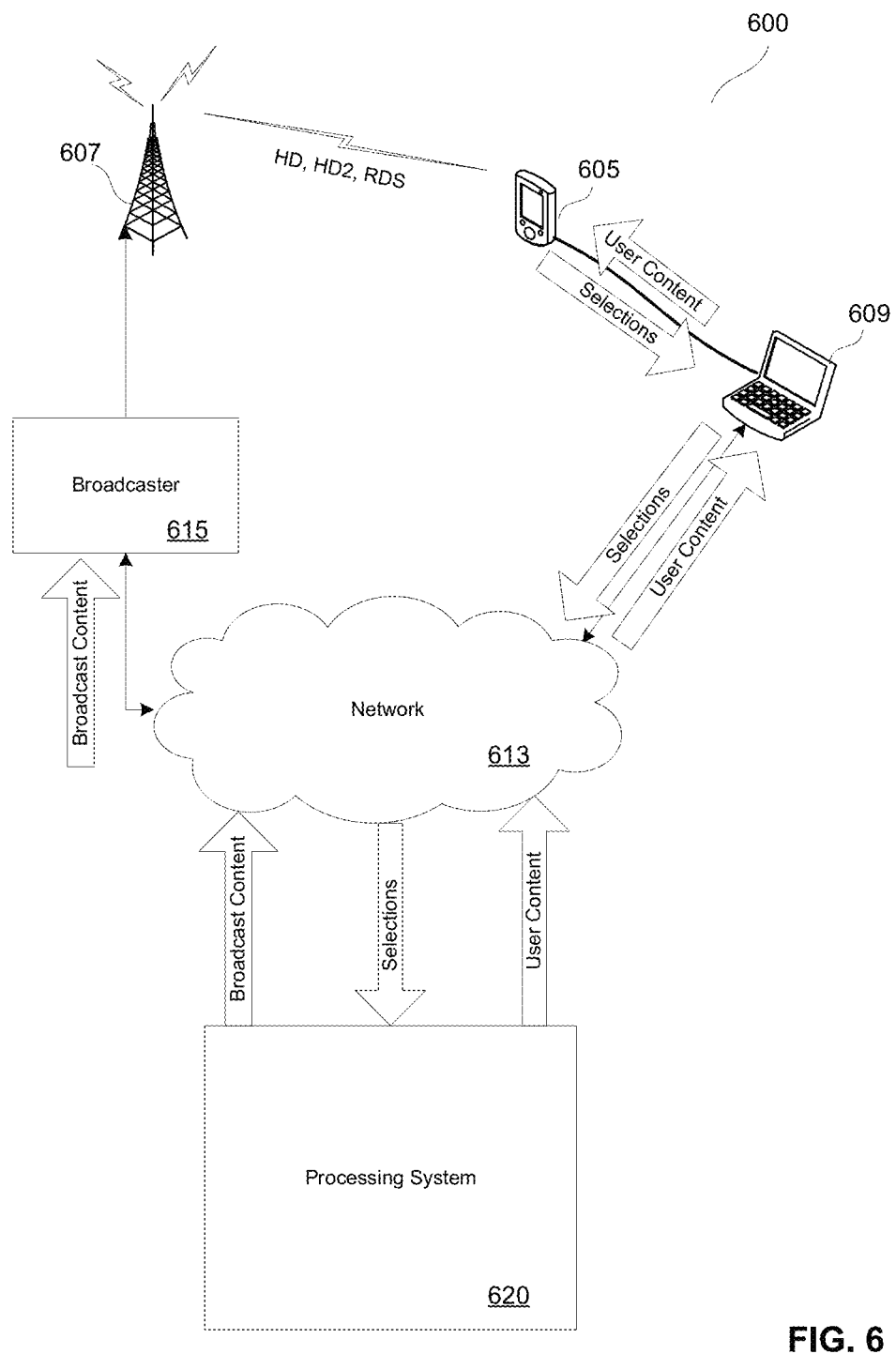
FIG. 6 is a diagram illustrating information flow between various elements of an interactive system according to an embodiment of the present disclosure.

Referring next to FIG. 6, an interactive system 600 according to various embodiments is disclosed. Interactive system 600 may include processing system 620, which can provide broadcast content to broadcasters 615, and can receive user selections generated at an end-user device 605. User selections can be transmitted to processing system 620 via computer 609, which is connected to processing system 620 through networks 613. Processing system 620 can also provide user content to end-user device 605 based on the selections received from end-user device 605. In some embodiments, computer 609 can be any device that can communicate with end-user device 605 and processing system 620. For example, computer 609 may include a television, digital recorder, music recording and/or playing device, laptop, desktop, or some other end-user device.

Broadcasters 615 can receive broadcast content via network 613, and transmit some or all of the received content utilizing broadcast equipment 607. The broadcast content can include songs, videos, advertisements, or other works to be broadcast. Broadcast content can also include enhanced content, a UNS identifier associated with the work or the enhanced content, and other information as desired. Some or all of the broadcast content may be used internally by the broadcaster, broadcast for reception by end user device 605, or both. The format of the content being broadcast by broadcast equipment 607 can include HD, HD2, or RDS compliant radio signals, or other suitable broadcasting signal formats disclosed in other embodiments herein.

End-user device 605 may be equipped with a radio tuner that receives HD, HD2 or RDS radio signals that include information in addition to traditional AM/FM content. In some embodiments, however, end-user device 605 requires no special receiver equipment. End-user device 605 may also include a selection button (not illustrated) that allows a user of end-user device 605 to tag, mark, or otherwise select certain broadcast spots or other portions of a broadcast for future action. End-user device 605 may also include other selection mechanisms, including a touch screen device, a track ball, a wheel, or any other device suitable for controlling and selecting.

Consider the following example, in which end-user device 605 is receiving a broadcast of a song the user of end-user device 605 finds appealing. The user can press a selection button or otherwise utilize end-user device 605 to generate an indication that marks or tags the song, or marks the then-current time and station to which end-user device 605 is tuned. In some embodiments the selection can be made at any time during the song, or for a short period of time after the song has finished.

Later, when the end-user device can connect to computer 609, for example via a docking station, a wired connection, a wireless connection, or otherwise, end-user device 605 can initiate a transfer of information indicating the earlier selection made by the user to processing system 620 via computer 609 and network 613. In some embodiments a device other than end-user device 605 may initiate the transfer. In response to receiving the user's selection, processing system 620 can upload user content to end-user device 605 via network 613 and computer 609. In some embodiments, the content sent by processing system 620 can be delivered to a destination other than end-user device 605, depending on user preferences. In some embodiments, delivery of content is subject to payment of a royalty or other fee.

The content provided by processing system 620 can include the tagged or marked song, advertisement, or other work, and may also include a work that was being played during the time end-user 605 made his selection. In some embodiments, the content may also include enhanced content related to the selected work, including background information on the artist, a coupon to receive a promotional item, or other desired content. The functionality provided by some embodiments can find use in circumstances where a user may wish to contact a business sponsor, but may not have an immediate method of recording the sponsor's contact information. In such a case, a user can simply press a button and tag the spot or commercial for delivery at a later time. Some embodiments utilize an end-user device 605 that includes wireless network connectivity functionality. In such a case, when a user hears the spot, song, or other content for which he wishes to receive additional information, he can contemporaneously retrieve the requested content from processing system 620.

Various embodiments of processing system 620 can deliver content based on subscriber preferences indicate the type of information a subscriber wishes to receive. These preferences can include, for example, an indication that upon selecting a song by a particular artist, the subscriber wishes to receive a list of other songs by the artist, or in the same genre, for possible purchase or simply for his own edification. In other embodiments, a subscriber may use end-user device 605 to indicate that he wants to receive concert dates for a selected artist, historical information about particular members of a band performing the selected work, or other desired content related to a song, music video, television program, or other work.

In some embodiments, if enough subscribers request the same types of information, processing system 620 may provide a notification to broadcaster 615 indicating the number of requests. In response to the notification, broadcaster 615 may then request processing system 620 to provide the additional information to the broadcaster 615, so that broadcaster 615 can broadcast the requested information. In other embodiments, multiple broadcasters in different areas (not illustrated) may receive the same work to be broadcast, but receive different enhancing information, such that the eventual broadcast by any particular broadcaster may be different from the broadcast of another broadcaster, even though both broadcasters are receiving the same work from processing system 620 concurrently.

Figure 7:
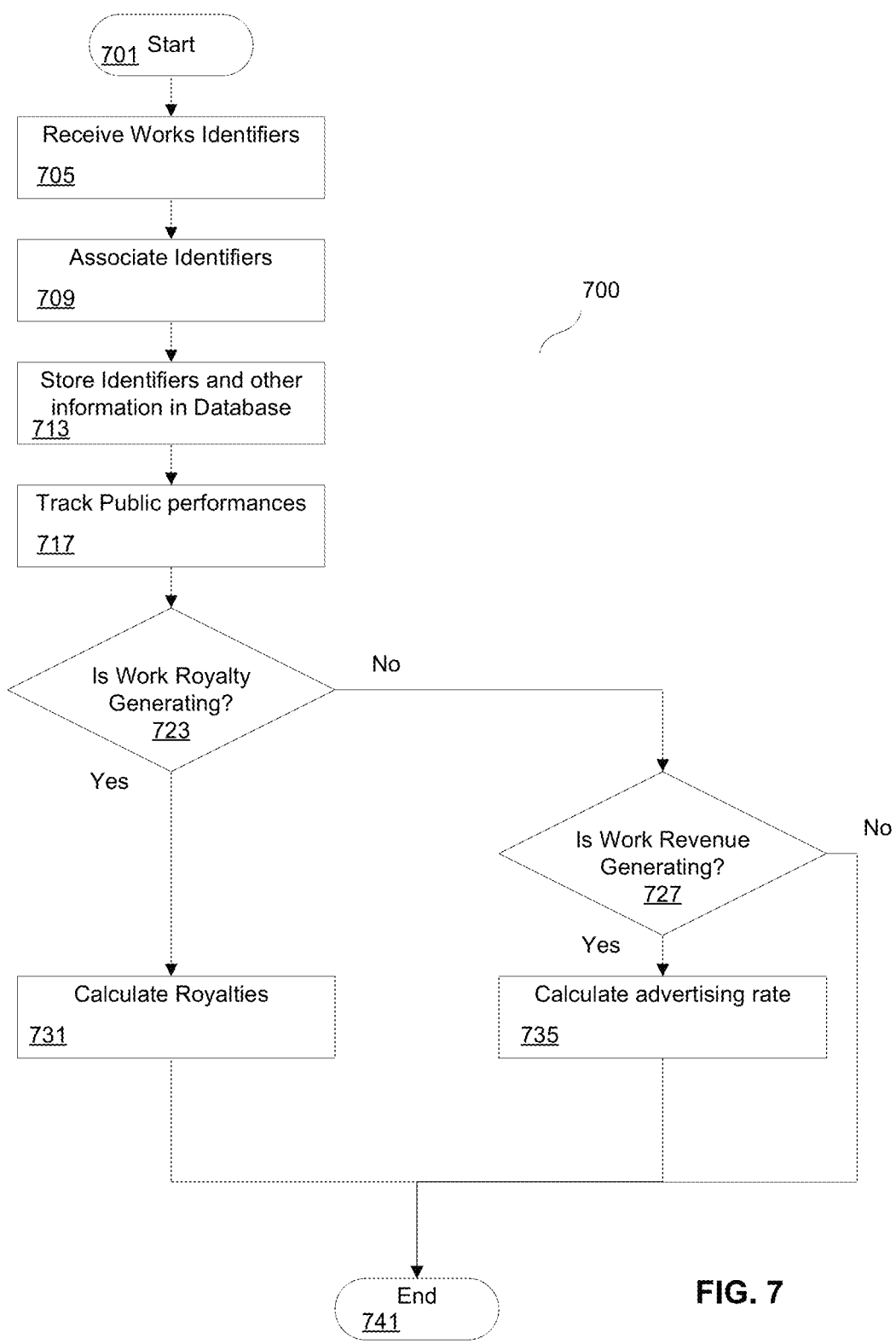
FIG. 7 is a flow diagram illustrating a method of tracking public performances according to an embodiment of the present disclosure.

Referring next to FIG. 7, a method 700 according to embodiments of the present disclosure is illustrated. Method 700 begins at block 701. As illustrated in block 705, a system employing a unified numbering system (UNS) can receive identifiers identifying particular works, for example songs, advertisements, or other broadcast spots. In some embodiments, this includes receiving a PNP message that can include a UNS identifier or a non-UNS identifier, such as a song title, artist name, or the like. In some embodiments, identifiers can also be received from various content providers. Identifiers received from content providers can be, in some instances, identifiers that are incompatible with identifiers used by one or more of the other content providers. The identifiers received from a content provider can include proprietary or non-proprietary identifiers, which are not necessarily incompatible with identifiers received from other content providers.

As illustrated in block 709, each of the received identifiers can be associated with an identifier selected from a set of unique, UNS identifiers. In some embodiments, the association can be accomplished based on a look-up procedure performed to determine if the identifier is a UNS identifier. In other instances, for example where the identifier is a non-UNS identifier, establishing an association with a UNS identifier can be performed by comparing an alias or other non-UNS identifier related to corresponding content associated with a work that is already associated with a UNS identifier. Thus, an association between a received identifier and a work already associated with a UNS identifier can be established, and on the basis of that association, the received work can be associated with a UNS identifier.

As illustrated in block 713, identifiers and other information can be stored in a database. In some embodiments, the identifiers and other information are stored together in a common database, while in some embodiments the identifiers are stored separately from other information and content. Thus, for example, one database implemented on one or more storage devices can be used for maintaining a database of UNS identifiers, another database can be used to implement storage of various non UNS identifiers and associated content, and yet another database or set of databases can be used to store works themselves. In other embodiments, identifiers, associated content, works, and other information can be stored together in a single database, or in some other desired combination of databases.

As illustrated in block 717, the unique identifiers or other information associated with a work can be used to track public performances of the work. For example, a particular work can be identified based on a UNS identifier received in a push-now-playing (PNP) message. In some embodiments, the fact that a UNS identifier is included in a PNP message can be interpreted to mean that the work has been broadcast or otherwise publicly performed. Thus, if a list or some other collection of UNS identifiers that have been included in a PNP message is maintained, that list can be used to track which works have been publicly performed.

In some embodiments, various acknowledgement indicators, responses delivered via alternative media, or other suitable non-PNP messages may include UNS identifiers or other content that can also be used to track public performances of works. For example, a message can include time indicators, source indicators, or various other information allowing the public performance of a work to be tracked to particular individuals, businesses, broadcasters, or other entities with a desired degree of detail. Furthermore, in some embodiments messages may not include UNS identifiers.

As illustrated in block 723, a determination can be made regarding whether a work is a song, movie, television show, or other royalty-generating work. The determination about whether the work is a royalty generating work can be made based on a UNS identifier or other information received in a PNP message or other message received from a subscriber or other entity, based on content associated with the work, or using another technique consistent with the present disclosure. For example, if a UNS identifier is associated with a copyrighted song, a royalty indicator flag, or some other suitable indicator, can be set in one or more of a UNS database, an enhancing database, a content database, or some other database.

As illustrated by block 731, if the work is of a type for which royalty payments might be due based on the work's public performance, royalties can be calculated. Royalty calculations can be based on an agreed amount due for each performance of the work, based upon various legal or statutory requirements, or set as otherwise desired. In some embodiments, the determination includes determining whether or not a royalty is due for a particular public performance of the work. Thus, the amount of royalties calculated can be zero. Note that as used herein, calculating royalties can include calculating a royalty rate.

As illustrated in block 727, if the work is not a royalty generating work, a decision can be made to determine if the work is a revenue generating work, for example an advertising spot or another type of work that someone pays to have broadcast. The determination about whether the work is a revenue generating work can be made based on a UNS identifier or other information received in a PNP message or other message received from a subscriber or other entity, based on content associated with the work, or using another technique consistent with the present disclosure.

As illustrated in block 735, if the work is an advertising spot or other revenue generating work, an advertising rate can be calculated. The advertising rate can be calculated using information related to tracked public performances. For example a list, database, or other collection of UNS identifiers can indicate particular advertisements or other revenue generating works that have been publicly performed. Content associated with the UNS identifiers can include an advertiser's name, address, type of product being advertised, and other related information. Additionally, other information or content received in a PNP or other message can provide a market, a time of broadcast, or other desired information. Using some or all of this information in conjunction with a UNS number, can be used to calculate an advertising rate based on a number of times a particular work has been broadcast, in which market particular spots have been aired, or the like. Furthermore, some embodiments receive information associated with subscriber interaction with particular content. In some of these embodiments, calculating an advertising rate can include considering how many subscribers or other users actually interacted with particular portions of particular works. Note that as used herein, calculating an advertising rate can include calculating an actual amount of revenue related to a particular work.

As illustrated by block 741, if the work is neither a royalty generating work nor a revenue generating work, for example if the work is a public domain work, a news item, or the like, method 700 can end. As further illustrated by block 741, method 700 can end after calculation of royalties or an advertising rate.

Figure 8:
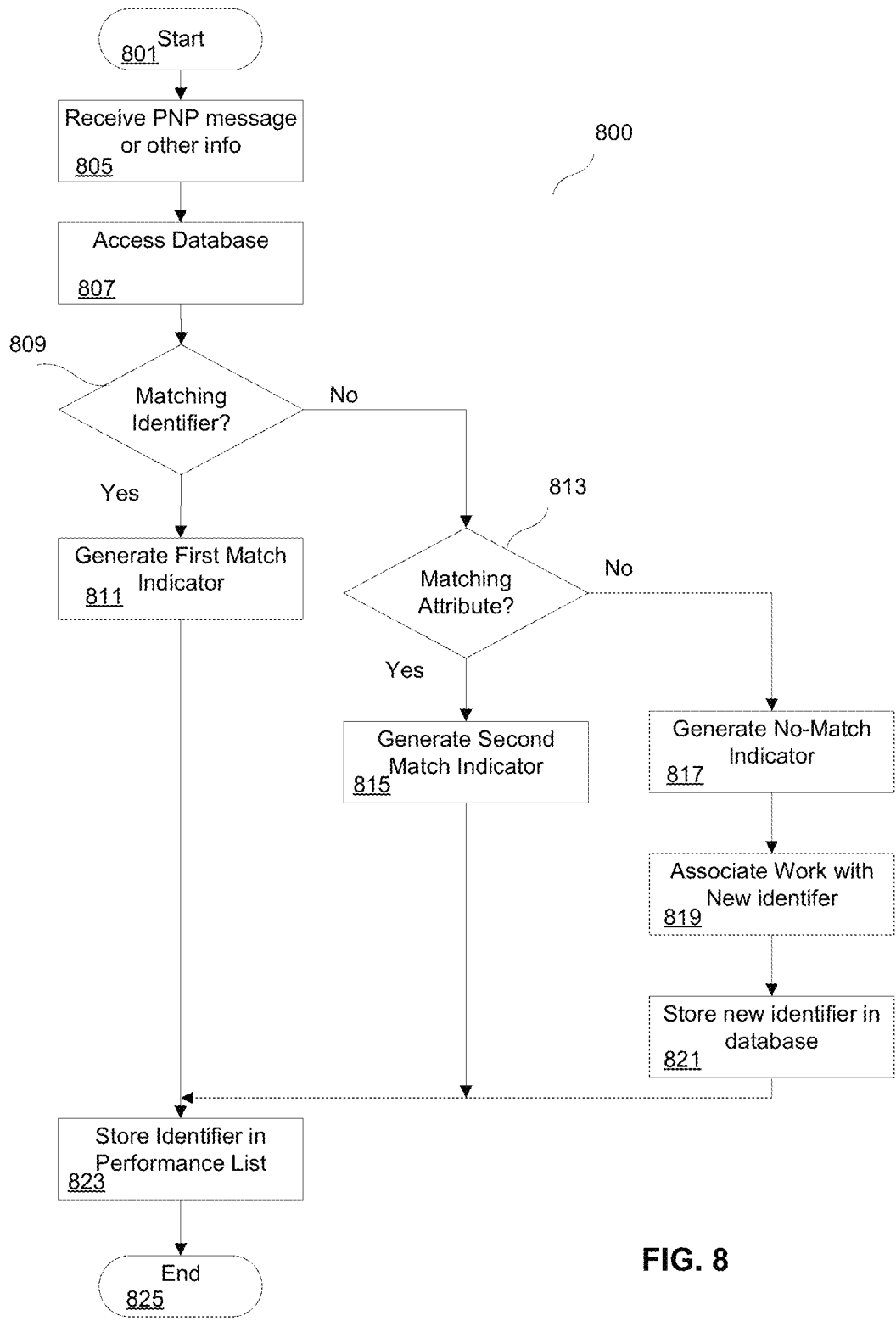
FIG. 8 is a flow diagram illustrating matching a work to a UNS identifier according to an embodiment of the present disclosure

Referring next to FIG. 8, a method 800 according to embodiments of the present disclosure is illustrated. Method 800 begins at block 801. As illustrated by block 805, information or other content related to a work can be received at a server or other processing system in the form of a push-now-playing (PNP) message sent from a broadcaster. In some embodiments, the received information can be received in a form other than a PNP message. For example, the information can be received in response to a request for information related to one or more works, or in conjunction with an upload of works or other related content. Furthermore, the information can be received from a source other than a broadcaster; for example an individual subscriber or a content provider.

In some embodiments, the received information can include a UNS identifier, a non-UNS identifier, an alias, or attributes such as a title, author, or length. In some embodiments, the received information can be associated with a broadcast work, such as a song or advertisement, or with a work that has been or will be delivered to a targeted individual or group. In some embodiments, the information relates to a work that is being delivered from a content provider. In various embodiments, an attempt can be made to match a work associated with the received content with a work that has been previously associated with a unique identifier stored in a UNS database.

As illustrated in block 807, in response to receiving content or other information related to a work, one or more databases can be accessed by a server or processing system. The accessed databases may reside local to the server or other processing system. In some embodiments, the accessed databases can be a remote database maintained by a content provider, a broadcaster, or otherwise. Furthermore, the one or more of the accessed databases can be distributed across multiple physical locations and machines, maintained in a single location using a single machine, or some combination of the above. In at least one embodiment, the accessed database includes a unified number system (UNS) database associating a unique identifier with a particular work, and/or information associated with that work.

As illustrated by block 809, data obtained by accessing one or more databases can be used in matching a work associated with received information with a work previously associated with a UNS identifier. For example, the received information can be checked to see if it includes a UNS identifier, and if so, the received UNS identifier can be compared to UNS identifiers stored in a UNS database. If the received UNS identifier matches a UNS identifier stored in the UNS database, a match indicator can be generated.

As illustrated by block 811, a first match indicator can be generated if a UNS identifier received in a PNP message, in conjunction with a work, or from some other source, matches a UNS identifier stored in a UNS database. The first match indicator can include setting or appending one or more flag bits to the received identifier, generating a new message independent of the received UNS identifier, storing a link to the location of the matched UNS identifier within the UNS database, or employing other suitable indication techniques consistent with the present disclosure.

As illustrated by block 813, if the received information includes what appears to be a UNS identifier, but the received UNS identifier does not match a UNS identifier stored in a UNS database, or if the received information does not include anything that appears to be a UNS identifier, an attempt can be made to match based on attributes. The received information can include attributes associated with a work, for example an alias, a title, an artist name, a broadcaster identifier, a time identifier, or other desired attributes associated with a work. Various databases, for example a UNS database, an enhanced content database, a scheduling database, or the like can include information that relates and associates a work to a unique identifier. The received attributes can be compared to the attributes in the various databases in an attempt to match the received attributes to the attributes of a work previously associated with a UNS identifier.

For example, consider the case in which received attributes include a title, artist, length and an air time. Assume further that data obtained from one or more databases shows that attributes of a particular work associated with a particular UNS identifier match the received attributes. The conclusion can then be reached that the received attributes refer to the work associated with that particular UNS identifier.

In some embodiments, a desired level of certainty can be set as a limit for considering whether the attributes match. For example, if a threshold of 70% is used, then 7 out of 10 attributes could be required to exactly match before block 813 would return a positive indication. In some embodiments, ranges can be used. For example, a received attribute indicating an air time of 16 seconds after 8:05 pm can be considered to match an attribute of 8:04 and 89 seconds, because the two attributes differ by less than 30 seconds. Other limits and thresholds may also be used. Furthermore, various matching techniques, for example translation of all numbers expressed as words into numerical values, root analysis, and noise-word removal can also be utilized in a matching process according to some embodiments of the disclosure.

As illustrated in block 815, after the received attributes are matched to the attributes of a work associated with a UNS identifier, a second match indictor can be generated. The second match indicator, like the first match indicator, can include setting or appending one or more flag bits to the received identifier, generating a new message independent of the received UNS identifier, storing a link to the location of the matched UNS identifier within the UNS database, or employing other suitable indication techniques consistent with the present disclosure.

As illustrated in block 817, if the received information does not include either a UNS identifier that matches an existing UNS identifier, or attributes that match the attributes of a work associated with an existing UNS identifier, a no-match indicator can be generated. Like the first and second match indicators, the no-match indicator may take the form of a flag, a message, a physical indication, or some other suitable indicator consistent with the teachings of the present disclosure.

As illustrated in block 819, in response to the no-match indictor, a work associated with the received information can be assigned a new UNS identifier. In some embodiments, assigning a new UNS identifier to the work associated with the received information can include generating a work order, email or other message indicating that manual action might be required. In some embodiments, however, especially when the received information includes a work, no manual action may be required. For example, in the case where a content provider sends a work and related content to be catalogued for the first time, there may not be a UNS identifier associated with either the work or any other work having the same attributes. In that case, the work can be stored in a content database, the content and attributes associated with the work can be stored in an enrichment database, and the UNS identifier assigned to that work can be stored in a UNS database, as illustrated by block 821. In some embodiments, the UNS identifier can be stored without storing the remainder of the information. Furthermore, some or all of the received information can be stored together or separately in one or a number of databases.

As illustrated by block 823, after a work has been matched to or associated with a UNS identifier, the UNS identifier can be stored in a performance list. It should be noted that various embodiments, for example embodiments that do not implement tracking, can omit block 823, as desired. The performance list can include any of various types of works, including advertisement spots, songs, television shows, or other media content that has been provided, performed, or broadcast. By storing the UNS identifier in a performed list, a more accurate accounting of royalties due, advertising payments due, or various royalty and advertising rates can be calculated. Method 800 ends as illustrated by block 825.

Figure 9:
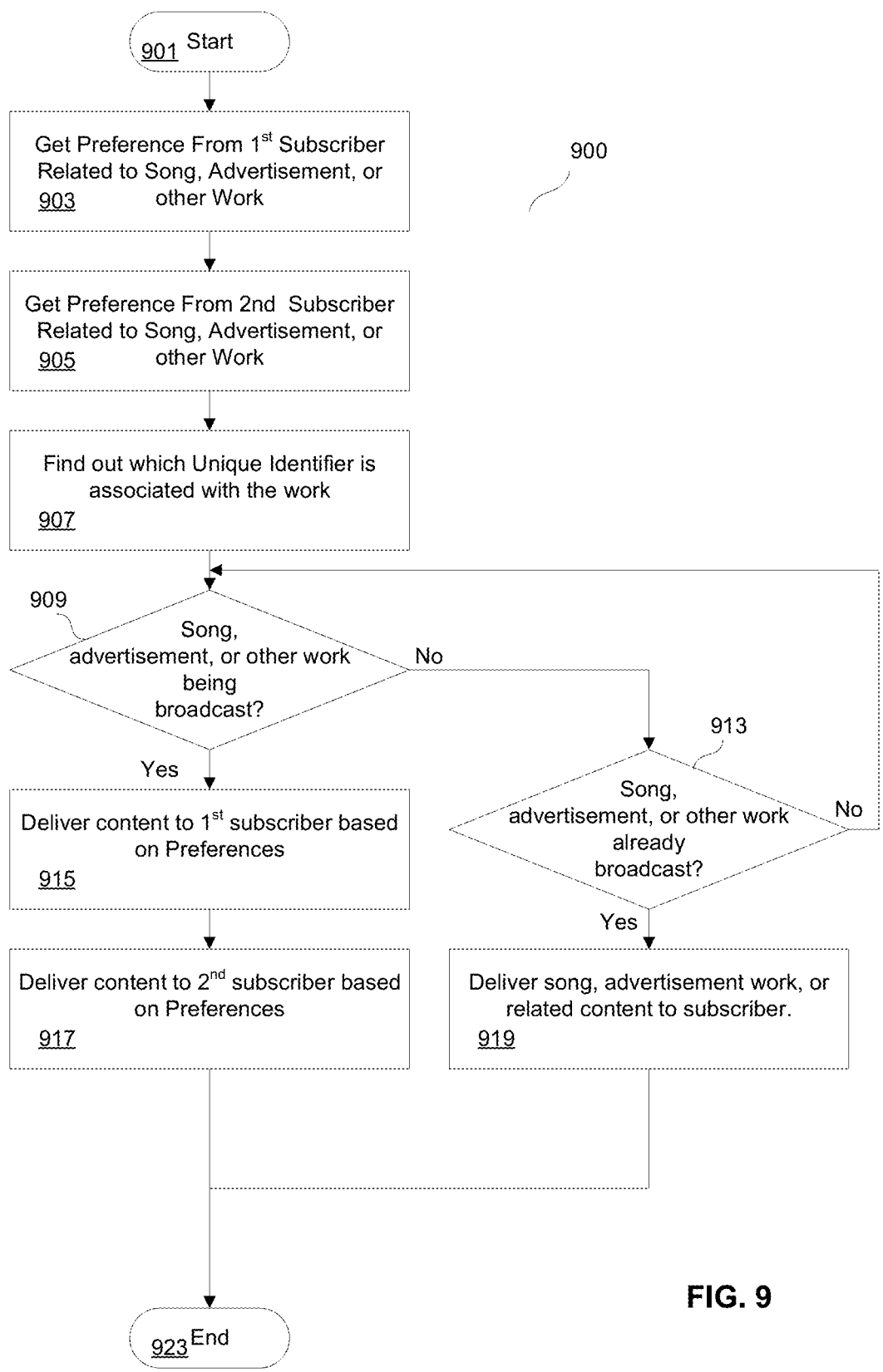
FIG. 9 is a flowchart illustrating interactive delivery of content according to an embodiment of the present disclosure.

Referring next to FIG. 9, a method 900 according to an embodiment of the present disclosure is illustrated. Method 900 begins as illustrated by block 901. As illustrated by block 903, a subscriber preference related to a song, advertisement or other work can be received. In some embodiments, the subscriber may include a broadcaster or other entity that provides works to others via a broadcast medium such as radio or the Internet. A subscriber may also include an end user or consumer to whom works are provided. The subscriber preference may include an indication about which particular works a subscriber wants to receive, which information related to a work the subscriber wishes to receive, the method by which the work or related content is to be delivered, the frequency with which the subscriber wants to receive information, the criticality of delivery, alternate preferences, or other desired information.

In some embodiments, the preference may include a UNS identifier indicating a work that has been delivered to a user. A preference may also include a UNS identifier associated with a work related to another work, which has been received by a subscriber via broadcast, Internet, or other means. A preference from a broadcaster, for example, may include the UNS identifier of a work for which a subscriber desires to obtain additional attributes or related content. In some embodiments, a preference may include the UNS identifier of a song a subscriber wants downloaded to a song repository or content database. In some embodiments, preferences may not include UNS identifiers.

Subscriber preferences can be received via any of various sources, including unsolicited messages, responses to inquiries, or third party services. In some embodiments, subscriber preferences may be based on preferences of a group to which the subscriber is a member. In some embodiments, one or more subscriber preferences may be based on defaults that may or may not have been preset by the subscriber. Furthermore, the preferences can be delivered via the PSTN, the Internet, Satellite, cellular telephones, wireless networks, or other suitable transmission media.

As illustrated by block 905, preferences from a second subscriber can also be received. In some embodiments, the preferences from the second subscriber can relate to the same work to which preferences from another subscriber relate, although the preferences themselves are different. In one or more embodiments, the preferences can relate to all works to be received by the subscribers from a particular source. For example, one subscriber may submit a preference that indicates one subscriber wants to receive a song's title and the artist's name whenever a song is received via an HD2 broadcast, while another subscriber may indicate that he wants to receive a song's highest popularity rating in addition to the song's title and the artist's name. Furthermore, one of the subscriber's may indicate that he wishes to receive other content or information via a second medium for every song broadcast during a particular time frame.

As illustrated by block 907, the unique UNS identifier associated with the work for which the first subscriber and the second subscriber indicated preferences can be determined utilizing various techniques consistent with the present disclosure. For example, the UNS identifier can be included in the subscriber preferences, or the preferences may be matched to a UNS identifier based on associated content, attributes, or otherwise.

As illustrated by block 909, a determination can be regarding whether the song advertisement or other work referred to in a subscriber's preference is currently being broadcast. The determination can be made based on information contained in the subscriber preferences, based on the content of a PNP message, based on a playlist, a list of provided content, or another desired technique consistent with the present disclosure.

As illustrated by blocks 915 and 917, in some embodiments, content can be delivered to the first subscriber and the second subscriber in response to a determination that a particular work is currently being broadcast or otherwise provided to the first and second subscriber. The content delivered to the first subscriber can be based on the first subscriber's preferences, while the content delivered to the second subscriber can be based on the second subscriber's preferences. Thus, in some embodiments, even though the same work is being provided to both the first subscriber and the second subscriber, each subscriber can receive different additional content related to the work.

As illustrated by block 913, if a work referred to by the subscribers' preferences is not currently being broadcast or otherwise delivered, a determination can be made regarding whether or not a work referenced by the subscribers' preferences has been previously broadcast. The determination can be based on content included in one or more of the subscriber preferences, information retrieved from one or more databases, information included in a PNP or other message, or in another suitable manner consistent with the principles of the present disclosure.

As illustrated in block 919, in response to a determination that the song or other work has been previously broadcast or otherwise publicly performed, the song, advertisement, work or other related content can be delivered to subscribers. Method 900 ends as illustrated by block 923.

It should be appreciated that although some of the illustrated embodiments are directed to providing content based on a work that is currently or was previously broadcast, in some embodiments, content can be provided to a subscriber while a work is pending broadcast or delivery.

Figure 10:
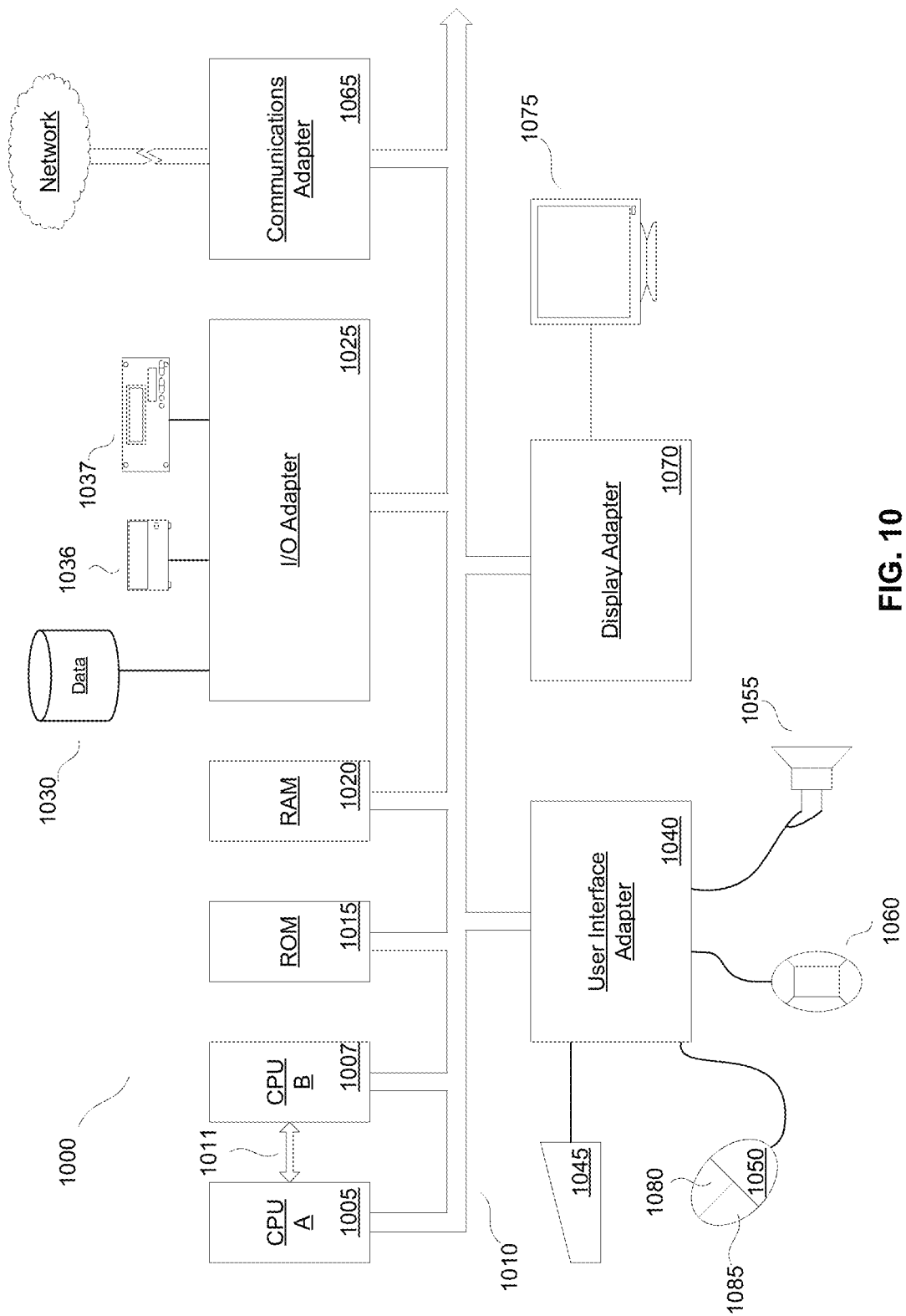
FIG. 10 is a high-level block diagram of a processing system according to embodiment of the present disclosure.

The methods and processes discussed previously, as well as other embodiments, may be implemented in a processing system executing a set of instructions stored in memory, or on a removable computer readable medium. An example of a system according to some embodiments is illustrated in FIG. 10. Referring now to FIG. 10, a high-level block diagram of a processing system is illustrated and discussed. Processing system 1000 may include one or more central processing units, such as CPU A 1005 and CPU B 1007, which may be conventional microprocessors interconnected with various other units via at least one system bus 1010. CPU A 1005 and CPU B 1007 may be separate cores of an individual, multi-core processor, or individual processors connected via a specialized bus 1011. In some embodiments, CPU A 1005 and/or CPU B 1007 may be a specialized processor, such as a graphics processor, other co-processor, or the like.

Processing system 1000 may include random access memory (RAM) 1020; read-only memory (ROM) 1015, wherein the ROM 1015 could also be erasable programmable read-only memory (EPROM) or electrically erasable programmable read-only memory (EEPROM); an input/output (I/O) adapter 1025, for connecting peripheral devices such as disk units 1030, optical drive 1036, or tape drive 1037 to system bus 1010; a user interface adapter 1040 for connecting keyboard 1045, mouse 1050, speaker 1055, microphone 1060, and/or other user interface devices to system bus 1010; a communications adapter 1065 for connecting processing system 1000 to an information network such as the Internet or any of various local area networks, wide area networks, telephone networks, or the like; and display adapter 1070 for connecting system bus 1010 to a display device such as monitor 1075 or television display. Mouse 1050 has a series of buttons 1080, 1085 and may be used to control a cursor shown on monitor 1075.

It will be understood that processing system 1000 may include other suitable data processing systems and circuitry without departing from the scope of the present disclosure. For example, processing system 1000 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any apparatus or tangible thing that embodies the program for use by or in connection with the instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Data structures and transmission of data (including wireless transmission) particular to aspects of the disclosure are also encompassed within the scope of the disclosure.

Various embodiments have been described for delivering content related to a commercial media program. Other variations and modifications of the embodiments disclosed may be made based on the description provided, without departing from the scope of the invention as set forth in the following claims.

What is claimed is:
1. A method comprising:
assigning different unique identifiers to each of a plurality of different instances of a content item, wherein the different unique identifiers have values included in different ranges of unique identifier values;
storing first information linking particular subscriber identifiers used by particular subscribers to refer to particular instances of the content items;
storing second information associating an enrichment identifier with a collection of enrichment content;

storing third information associating the enrichment identifier with a particular range of unique identifier values; and delivering enhanced content to subscribers based on the first information, the second information, and the third information.

2. The method of claim 1, further comprising:
providing a first type of enrichment content for first primary content associated with unique identifiers in a first range of unique identifier values; and
providing a second type of enrichment content for second primary content associated with unique identifiers in a second range of unique identifier values different from the first range of unique identifier values.

3. The method of claim 1, further comprising:
assigning a master unique identifier to a collection of enrichment content.

4. The method of claim 3, further comprising:
storing enrichment content in a database including relational entries linking enrichment content to the master unique identifier.

5. The method of claim 1, further comprising:
designating particular content for delivery to different types of subscriber;
storing multiple instances of a primary content item; and
assigning each instance of the multiple instances of the primary content item a different unique identifier.

6. The method of claim 1, further comprising:
establishing associations between a master unique identifier and an alias identifier used by one or more particular subscribers.

7. The method of claim 1, further comprising:
creating duplicate instances of primary content for use in different broadcast markets; and
assigning each duplicate instance of the primary content a different unique identifier.

8. A processing system comprising:
a processor and associated memory configured to:
assign different unique identifiers to each of a plurality of different instances of a content item, wherein the different unique identifiers have values included in different ranges of unique identifier values;
store first information linking particular subscriber identifiers used by particular subscribers to refer to particular instances of the content items;
store second information associating an enrichment identifier with a collection of enrichment content;
store third information associating the enrichment identifier with a particular range of unique identifier values; and
deliver enhanced content to subscribers based on the first information, the second information, and the third information.

9. The processing system of claim 8, wherein the processor and associated memory are further configured to:
provide a first type of enrichment content for first primary content associated with unique identifiers in a first range of unique identifier values; and
provide a second type of enrichment content for second primary content associated with unique identifiers in a second range of unique identifier values different from the first range of unique identifier values.

10. The processing system of claim 8, wherein the processor and associated memory are further configured to:
assign a master unique identifier to a collection of enrichment content.

11. The processing system of claim 10, wherein the processor and associated memory are further configured to:
store enrichment content in a database including relational entries linking enrichment content to the master unique identifier.

12. The processing system of claim 8, wherein the processor and associated memory are further configured to:
designate particular content for delivery to different types of subscriber;
store multiple instances of a primary content item; and
assign each instance of the multiple instances of the primary content item a different unique identifier.

13. The processing system of claim 8, wherein the processor and associated memory are further configured to:
establish associations between a master unique identifier and an alias identifier used by one or more particular subscribers.

14. The processing system of claim 8, wherein the processor and associated memory are further configured to:
create duplicate instances of primary content for use in different broadcast markets; and
assign each duplicate instance of the primary content a different unique identifier.

15. A non-transitory computer readable medium tangibly embodying a program of instructions configured to be stored in a memory and executed by a processor implementing a first advertisement management system, the program of instructions including:
at least one instruction to assign different unique identifiers to each of a plurality of different instances of a content item, wherein the different unique identifiers have values included in different ranges of unique identifier values;
at least one instruction to store first information linking particular subscriber identifiers used by particular subscribers to refer to particular instances of the content items;
at least one instruction to store second information associating an enrichment identifier with a collection of enrichment content;
at least one instruction to store third information associating the enrichment identifier with a particular range of unique identifier values; and
at least one instruction to deliver enhanced content to subscribers based on the first information, the second information, and the third information.

16. The non-transitory computer readable medium of claim 15, wherein the program of instructions further includes:
at least one instruction to provide a first type of enrichment content for first primary content associated with unique identifiers in a first range of unique identifier values; and
at least one instruction to provide a second type of enrichment content for second primary content associated with unique identifiers in a second range of unique identifier values different from the first range of unique identifier values.

17. The non-transitory computer readable medium of claim 15, wherein the program of instructions further includes:
at least one instruction to assign a master unique identifier to a collection of enrichment content.

18. The non-transitory computer readable medium of claim 17, wherein the program of instructions further includes:

at least one instruction to store enrichment content in a database including relational entries linking enrichment content to the master unique identifier.

19. The non-transitory computer readable medium of claim 15, wherein the program of instructions further includes:
   at least one instruction to at least one instruction to designate particular content for delivery to different types of subscriber;
   at least one instruction to store multiple instances of a primary content item; and
   at least one instruction to assign each instance of the multiple instances of the primary content item a different unique identifier.

20. The non-transitory computer readable medium of claim 15, wherein the program of instructions further includes:
   at least one instruction to establish associations between a master unique identifier and an alias identifier used by one or more particular subscribers.

\* \* \* \* \*